Dec. 13, 1966    C. LEAVELL    3,291,425
SYSTEM FOR ELIMINATING VIBRATION
Filed April 9, 1962    3 Sheets-Sheet 3

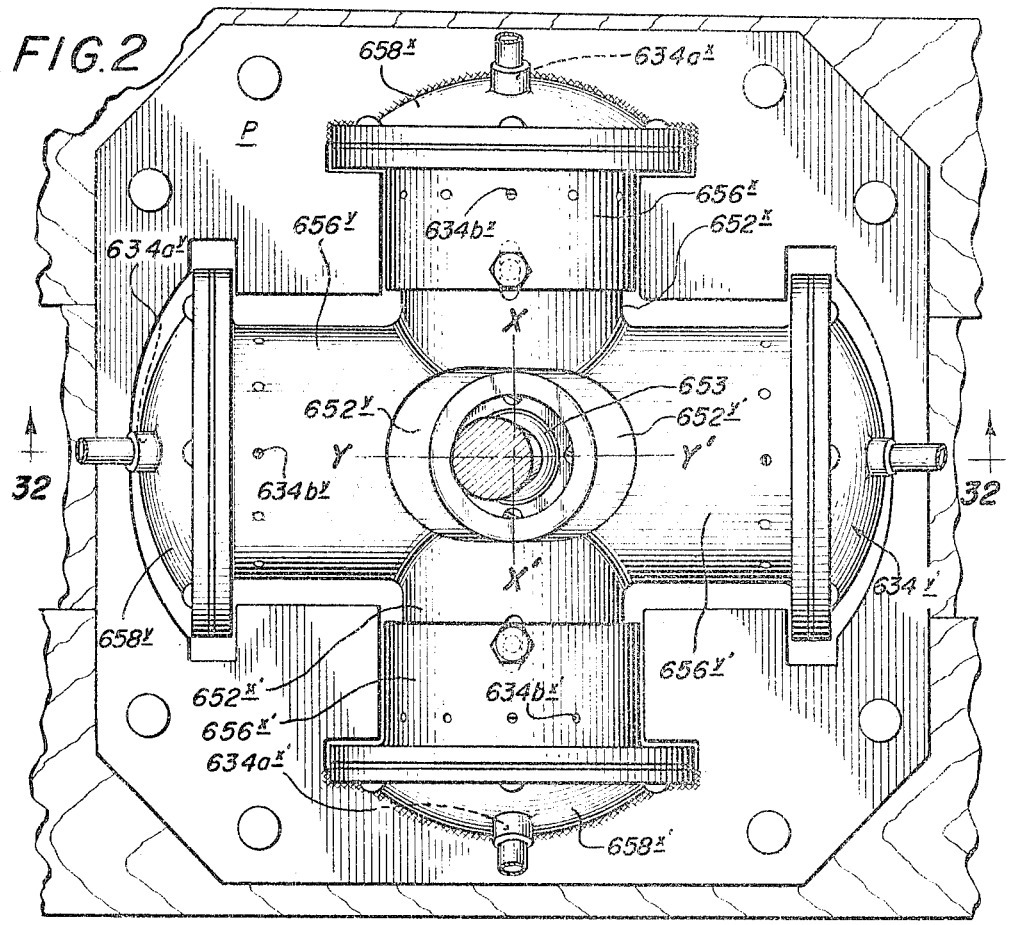
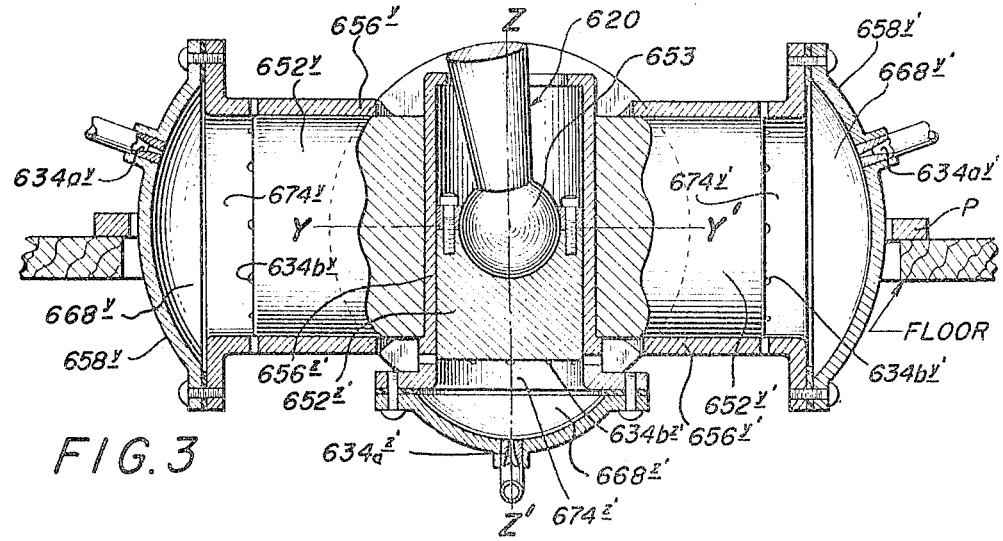

United States Patent Office 3,291,425
Patented Dec. 13, 1966

3,291,425
SYSTEM FOR ELIMINATING VIBRATION
Charles Leavell, 206 S. Fairfield Ave., Lombard, Ill.
Filed Apr. 9, 1962, Ser. No. 185,988
3 Claims. (Cl. 248—22)

This invention is concerned with the elimination of vibration and it has utility in application to a wide variety of vibrating structures. In particular, the invention is concerned with the elimination of complex vibrations as, for example, those generated by factory machines and which, in the past, have been objectionably transmitted to the supports therefor.

The present application is a continuation-in-part of my copending patent application, Ser. No. 742,878, filed June 18, 1958, now Patent No. 3,028,841, which discloses a vibration-isolating, force-transmitting linkage of general utility in the exemplary environment of a percussive tool structure, and explains that the greater part of anti-vibration research pertains to the tripartite mechanical combination of (1) a desirably or unavoidably vibrating body, (2) a second body in which the occurrence of vibration is objectionable, and (3) connecting structure accomplishing a necessary transmission of force between the two bodies. Such patent also explains that the problem of greatest concern in such tripartite vibratile mechanical combinations is that of maintaining the necessary transmission of force between such two bodies and at the same time minimizing the communication of vibration therethrough from the desirably or unavoidably vibrating body to the second body in which the occurrence of vibration is undesirable.

Additionally, such aforementioned patent introduces a system for classifying vibrations in terms of the degrees of complexity of the paths traced in space by their vibratory motions; and specifically, the distinctions relative to path-complexity defined as in analytic geometry, in terms of the fewest-dimension spaces capable of containing the paths, are used for such classification. Accordingly, vibration is classified with reference to a path traced by it is as being either (A) a 1-dimensional or linear vibration, or (B) a 2-dimensional or planar vibration, or (C) a 3-dimensional or solid vibration, depending on whether (a) such path can exist within a straight line, or (b) not being capable of such confinement within a straight line, can exist within a plane, or (c) not being capable of such confinement within a plane, can exist within a solid space (i.e., a volume).

As noted in the aforementioned patent, if the element exhibiting the vibration to be categorized in accordance with this classification scheme is a ponderable body of greater dimensions than a geometric point, the question arises as to just what point either upon its surface or within its mass is to be taken as tracing the path with respect to which the vibratory motion of the element will be classified as being either 1-, 2-, or 3-dimensional (or linear, planar, or solid), and it may be stated in general that the center of gravity of such a body can be used conveniently as the determining point. In other words, the vibratory motion of the body will generally be classified in accordance with the nature of the path traced by its center of gravity.

However, since any such ponderable body may (or may not) exhibit an angular vibration about its center of gravity simultaneously with the description of a path by the center of gravity, and also when its center of gravity is stationary, the classification system was expanded in such aforementioned patent to include the following seven cases:

I (a) Vibratory motion of a body comprising a *linear* vibration of its center of gravity associated with a condition of no angular vibration of the body.
(b) Vibratory motion of a body comprising a *linear* vibration of its center of gravity associated with an angular vibration about its center of gravity.

II (a) Vibratory motion of a body comprising a *planar* vibration of its center of gravity associated with a condition of no angular vibration of the body.
(b) Vibratory motion of a body comprising a *planar* vibration of its center of gravity associated with an angular vibration about its center of gravity.

III (a) Vibratory motion of a body comprising a *solid* vibration of its center of gravity associated with a condition of no angular vibration of the body.
(b) Vibratory motion of a body comprising a *solid* vibration of its center of gravity associated with an angular vibration about its center of gravity.

IV

Vibratory motion of a body comprising an angular vibration about its center of gravity associated with a stationary condition of its center of gravity.

As stated hereinbefore, such Patent No. 3,028,841 discloses a vibration-isolating, force-transmitting linkage of general utility useful in connection with the elimination of 1-, 2-, and 3-dimensional vibrations, and specifically exemplifies such linkage in application to the elimination of 1-dimensional or linear vibratory motions coming within division I(a) of the foregoing classification system, selecting, for illustrative purposes, the environment of a pneumatic percussive tool because such environment provides an instance of 1-dimensional or linear vibration that is especially difficult to eliminate.

In distinction thereto, the present invention is concerned with and has for its objects, among others, the provision of novel vibration-isolating, force-transmitting linkage compositions defining the aforesaid connecting structure 3 accomplishing a necessary transmission of force between a vibrating body 1 and a second body 2 in which the occurrence of vibration is objectionable to eliminate 2-dimensional and 3-dimensional vibratory motions coming within divisions II(a) and III(b) of the foregoing classification system. As the specification develops, additional objects and advantages of the invention will become apparent.

Exemplary embodiments of the invention are illustrated in the accompanying drawings in which:

FIGURE 2 is a top plan view of a factory-machine support showing a linkage composition for eliminating 3-dimensional or solid vibration;

FIGURE 3 is a transverse sectional view taken along the plane 3—3 of the FIGURE 2;

Figure 1:
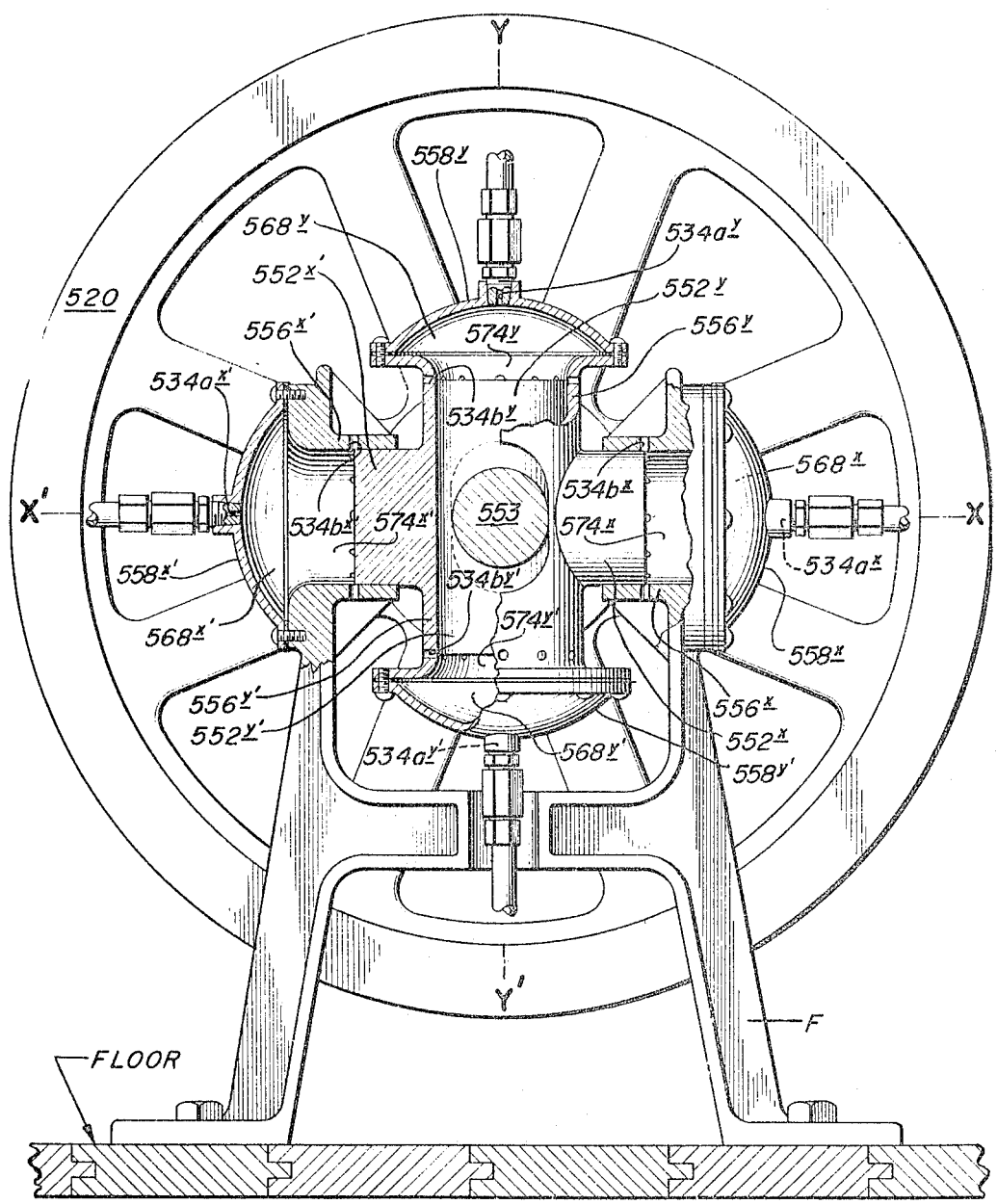
FIGURE 1 is an end view, largely in elevation but with parts broken away and shown in section, of a linkage composition for eliminating 2-dimensional or planar vibration illustrated in the environment of a flywheel structure.

The structure shown in FIGURE 1 is illustrative of the type of vibration identified in paragraph II(a) of the foregoing classification; namely, vibratory motion of a body comprising a *planar* vibration of its center of gravity associated with a condition of no angular vibration of the body. The structural composition of FIGURE 1 comprises a flywheel 520 which is the body 1 in which the occurrence of vibration is necessary or unavoidable, and the flywheel includes a shaft 553 journalled for rotation in the force-transmitting linkage system which supportingly connects the flywheel with a frame F which constitutes the body 2 in which the occurrence of vibration is undesirable. For purposes of the present discussion, only static unbalance of the flywheel is considered and dynamic unbalance, if any, is taken to be substantially non-existent, which is the case where the flywheel is relatively thin.

A condition of static unbalance may arise in at least one of two ways. First, the flywheel may have one or more unsymmetrically-oriented heavy spots or areas located radially outwardly from the axis of rotation thereof, and if a plurality of such heavy areas exist they are assumed to lie within a single plane normal to the axis of rotation. With such a condition, rotation of the flywheel will cause translational displacements of the center of gravity thereof along such plane; or stated another way, the axis of rotation of the flywheel shaft (which axis contains the center of gravity of the flywheel) will describe a rotary path about an axis fixed in space. Second, in relatively large flywheels, especially those built up of sections, the rim of the flywheel expands radially during rotation thereof because of the centrifugal force acting thereon, and it would be exceedingly unusual for such expansion to be perfectly symmetrical (because of non-homogeneity of the metal, differences in the weight of the rim in different areas thereabout, etc.) and as a consequence, the center of gravity of the flywheel will have translational planar displacements enforced thereon, and the magnitude of such displacements is, quite evidently, a function of the angular velocity of the flywheel.

In the structure shown in FIGURE 1, the flywheel shaft is journalled for rotation in a vibration-isolating, force-transmitting linkage structure adapted to isolate 2-dimensional or planar vibrations from a frame or support F which is bolted or otherwise rigidly secured to a support surface, such as the floor indicated in the drawing with the legend "Floor." The planar vibrations of the center of gravity of the flywheel 520 occur in a plane substantially parallel to the plane defined by the axes X–X' and Y–Y' which are normal to and intersect each other, with the location of the intersection being the origin of a system of rectangular coordinates defined by the X and Y axes. The plane of the vibratory displacements of the center of gravity of the rotative system (i.e., the flywheel and shaft) could be coincident with the plane defined by the X–Y axes, depending upon the length of the shaft, weight distribution, etc.

Rigidly secured to the frame F or formed integrally therewith are a pair of casing elements $556^x$ and $556^{x'}$ respectively defining cylinders $574^x$ and $574^{x'}$ therein, the longitudinal axes of which are coincident with the axis X—X. Bolted or otherwise rigidly related to the respective casing elements are caps or end closures $558^x$ and $558^{x'}$ that respectively define relatively large chambers $568^x$ and $568^{x'}$ therewithin which are in open communication with the respective cylinders $574^x$ and $574^{x'}$. Each of the chambers together with the cylinder associated therewith defines a constant pressure space.

Respectively mounted for reciprocable movement in the cylinders are pistons $552^x$ and $552^{x'}$ which are rigidly united with each other through a casing element $556^y$–$556^{y'}$, whereby the pistons reciprocate within their respective cylinders simultaneously in the same directions along the axis X–X'. The casing element $556^y$–$556^{y'}$ defines therein an elongated cylinder having end portions $574^y$ and $574^{y'}$, the longitudinal axes of which are coincident with the axis Y–Y'. The casing element $556^y$–$556^{y'}$ is equipped at the opposite end portions thereof with caps or end closures $558^y$ and $558^{y'}$ bolted or otherwise secured thereto, and which respectively define relatively large chambers $568^y$ and $568^{y'}$ which respectively communicate with the cylinder end portions $574^y$ and $574^{y'}$. Each of the chambers together with the cylinder associated therewith defines a constant pressure space. Mounted for reciprocable movement within such elongated cylinder is an elongated, unitary piston having end portions $552^y$ and $552^{y'}$ which necessarily reciprocate simultaneously in the same directions along the axis Y–Y'.

The flywheel 520 is constrained on the shaft 553 so as to rotate therewith, and the shaft is journalled for rotation in the unitary piston $552^y$–$552^{y'}$. The shaft 553 may be rotated by any suitable means (not shown), and since the unitary piston $552^y$–$552^{y'}$ is reciprocable along the axis Y—Y' the shaft 553 must be free to reciprocate therewith; and provision therefor is afforded by providing the elements $556^y$–$556^{y'}$ with diametrically oriented openings elongated along the axis Y–Y' and through which the shaft 553 extends.

The four individual constant pressure spaces are respectively supplied with a gaseous fluid under pressure, compressed air for example, through restricted inlet orifices $534^{ax}$, $534^{ax'}$, $534^{ay}$ and $534^{ay'}$; and are also provided with exhaust outlets $534^{bx}$, $534^{bx'}$, $534^{by}$ and $534^{by'}$. The exhaust outlets are located along the respective cylinders and are adapted to be traversed by the respectively associated pistons which regulatively control the rate of exhaust flow therethrough.

Each of the four individual vibration-isolating, force-transmitting linkages (which together comprise the force-transmitting linkage composition and respectively include, in the first instance, the cylinder $574^x$, chamber $568^x$, piston $552^x$, restricted inlet orifice $534^{ax}$, and exhaust outlet $534^{bx}$; in the second instance, corresponding components $574^{x'}$, $568^{x'}$, $552^{x'}$, $534^{ax'}$, and $534^{bx'}$; in the third instance, components $574^y$, $568^y$, $552^y$, $534^{ay}$, and $534^{by}$; and in the fourth instance, $574^{y'}$, $568^{y'}$, $552^{y'}$, $534^{ay'}$, and $534^{by'}$) in their respective individual actions, is similar to the force-transmitting linkage structure described in detail in the aforesaid patent, and reference may be made thereto for a detailed description.

Briefly summarized, vibratory displacements or reciprocations of the respective pistons in their associated cylinders do not cause a change in the pressure within the respectively associated constant pressure spaces because the total volume of each constant pressure space is sufficiently large relative to the changes caused therein by the vibratory displacements of the associated piston that substantially no change in pressure occurs during any such displacements. Therefore, the force transmitted between the relatively reciprocable opposed surfaces of each piston and the corresponding casing cap remains substantially constant during each such vibratory displacement of the piston.

However, the pressure force defined by the gaseous column extending between the end of each cylinder and the opposing surface of the associated closure cap is regulatively altered to compensate for any unbalanced force operative on the flywheel or shaft in either direction along the X and Y axes or for changes in the value of any such force. An unbalanced force will result, for example, when the X axis or axes of the pistons $552^x$ and $552^{x'}$ are not perfectly horizontal (i.e., the apparatus is not perfectly leveled), or when the shaft 553 is belt driven which necessarily applies a transverse load or force to the shaft. Using the same examples, a change may occur in any such unbalanced force, in the first instance, if the orientation of the axis X–X' is shifted or in the second instance, if there is a change in the pulling force of such driving belt. In any event, the value of the pressure force acting against each piston is regulatively adjusted to automatically compensate therefor by altering the effective escape area of the exhaust outlets and thereby changing the rate of escape of the pressure fluid from the constant pressure spaces; and if the rate of escape is decreased, the pressure force will correspondingly increase; and if the rate of escape is increased, the pressure force will correspondingly decrease.

The various linkages coact in the following manner to effect a necessary transmission of force between the vibrating body (comprising the flywheel 520 and shaft 553) and the body in which vibration is undesirable (comprising the frame F and elements to which it is rigidly attached) without transmitting vibration therebetween, and to regulatively adjust the value of such transmitted force to compensate for the application of loading forces, or changes in the values thereof, that tend to displace the flywheel and shaft transversely and similarly displace the center of gravity of the flywheel in a plane parallel to the plane defined by the X and Y axes. Compressed air or other pressure fluid is continuously supplied to the constant pressure spaces $568^x$ and $568^{x'}$ through the respectively associated restricted inlet orifices; and pressure fluid is also continuously supplied through the restricted inlet orifice thereof to the constant pressure spaces $568^y$ and $568^{y'}$. With the flywheel at rest and with no loading force being applied thereto, and assuming that the structure is properly leveled, the pressure forces respectively operative between the relatively reciprocable opposed surfaces of the piston $552^x$ and end closure $558^x$, and between such corresponding surfaces of the piston $552^{x'}$ and end closure $558^{x'}$, will be substantially equal and the pistons will be positioned as illustrated in FIGURE 1, that is, partially uncovering the exhaust outlets associated therewith. Thus, the pistons are centered along the X axis and are symmetrically disposed with respect to the origin of the coordinate X–Y axes. In such configuration, pressure fluid continuously flows through each of the constant pressure spaces $568^x$–$574^x$ and $568^{x'}$–$574^{x'}$, being admitted thereto through the inlet orifices and escaping therefrom through the exhaust outlets.

In an identical manner, pressure fluid continuously flows into the constant pressure spaces $568^y$–$574^y$ and $568^{y'}$–$574^{y'}$ through the respectively associated inlet orifices and escapes therefrom through the exhaust outlets $534^{by}$ and $534^{by'}$ because such outlets are partially uncovered by the pistons $552^y$ and $552^{y'}$. The pressure force operative between the relatively reciprocable opposed surfaces of the piston $552^{y'}$ and end closure $558^{y'}$ is substantially superior in value to the pressure force operative between the relatively reciprocable opposed surfaces of the piston $552^y$ and end closure $558^y$ because it is supporting the weight of the flywheel 520 and at least a portion of the weight of the shaft 553. However, the pistons $552^y$ and $552^{y'}$ are centered along the Y axis and are symmetrically disposed with respect to the origin of the coordinate X–Y axes.

This condition obtains so long as there is no change in either the value or direction of the loading force and so long as the flywheel is stationary. If, however, there is a change in such loading force as, for example, the shaft 553 being connected to a drive belt and which for purposes of specific description is assumed to impose a load or force on the shaft tending to displace it and the linkage composition toward the right along the X–X' axis, the piston $552^x$ in being displaced thereby in such direction will cover the exhaust outlet $534^{bx}$ to a greater extent and thereby reduce the effective escape area thereof. As a consequence, the pressure active between the piston $552^x$ and end closure $558^x$ will build up or increase in magnitude until the value thereof is sufficiently great to displace the piston toward the left and return it to its prior stable location.

At the same time, such change in the loading force initially displaces the piston $552^{x'}$ to the right, and this will result in a greater escape of pressure fluid from the constant pressure space $568^{x'}$–$574^{x'}$ because the exhaust outlet $534^{bx'}$ is uncovered to a greater extent. Consequently, the pressure force active between the piston $552^{x'}$ and end closure $558^{x'}$ will decrease in value which will aid in the corrective displacement of the rigidly related pistons $552^x$ and $552^{x'}$ to their prior stable position.

This same type of corrective action will occur if any such change in the loading force tends to displace the rigidly related pistons $552^y$ and $552^{y'}$ in either direction along the Y–Y' axis; and if any such change in the loading force is not precisely oriented along either the X or Y axis, it is analyzable into vector components acting therealong, and the corrective action of the linkage composition that returns the shaft 553 and all four pistons to the stable position illustrated in FIGURE 1 occurs simultaneously in both the X–X' and Y–Y' linkage structures in the same manner as described.

When the flywheel 520 is rotated, any unbalanced heavy spots or areas therealong, or the non-uniform or unsymmetrical expansion thereof caused by the centrifugal forces acting especially on the rim of the flywheel (see for example, Elements of Machine Design, by Kimbal and Barr, 3rd edition, pp. 437 through 442, in particular), cause the center of gravity of the flywheel to display radial translations, whereby such center of gravity describes a rotary path about a fixed axis which may be taken to be a line through the origin of the X–Y axes normal to the plane defined thereby.

Quite evidently, the rigidly related pistons $552^x$ and $552^{x'}$ will be cyclically displaced by such translations of the center of gravity and shaft 553 in alternate opposite directions along the X–X' axis, and the rigidly related pistons $552^y$ and $552^{y'}$ will similarly be cyclically displaced in alternate opposite directions along the Y—Y' axis. Such displacements of the pistons will not, however, transmit corresponding displacements or vibrations to the frame F because all of the pressure forces active on the four pistons remain substantially constant during each cyclic displacement thereof for the reasons heretofore indicated which concern the large volume of each of the constant pressure spaces and relatively small changes therein caused by the vibratory displacements of the pistons.

In terms of structure, it will be apparent that the pistons $552^x$ and $552^{x'}$ mechanically include the cylinder $574^y$–$574^{y'}$ so that such cylinder is necessarily displaced along the X–X' axis in accordance with the cyclic vibratory displacements of such pistons; and it is equally apparent that the shaft 553 can be displaced along the Y–Y' axis simultaneously with the rigidly related pistons $552^y$ and $552^{y'}$ in which it is journalled for rotation because of the elongated openings in the cylindrical wall of the cylinder casing $556^y$–$556^{y'}$. Therefore, the shaft 553 and piston structure $552^y$–$552^{y'}$ are free to vibrate along the Y axis without transmitting vibration to the composite cylinder casing 556$^y$–556$^{y'}$ and pistons 552$^x$–552$^{x'}$ rigidly related thereto, yet are force-connected thereto by the "Y" and "Y'" linkage structure; and the pistons 552$^x$ and 552$^{x'}$ are free to vibrate along the X axis without transmitting vibration to the cylinder casings 556$^x$ and 556$^{x'}$ and frame F rigidly related thereto, yet are force-connected thereto by the "X" and "X'" linkage structures.

The embodiment of the invention illustrated in FIGURES 2 and 3 has for its purpose the elimination of 3-dimensional or solid vibration. An exemplary instance of vibration of this type is that which occurs at the supports of a factory machine, although there are many other examples thereof some of which will be noted hereinafter. It will be quite apparent that such vibration will have both horizontal and vertical components of unpredictable value and direction, and the vertically oriented components may be accompanied by changes in the load supported by the machine. In this latter respect, it will be evident that the downwardly directed load or force component imposed by such machine on the supports therefor will vary in accordance with the weight of the work piece or work material being carried by the machine at any particular time.

With respect to the elimination of a horizontally oriented vibration, the structure shown in FIGURES 2 and 3 corresponds in essential detail to the structure illustrated in FIGURE 1, and described in detail hereinbefore. In this regard, the structure of FIGURE 1 has simply been turned on its side so that the "X" and "Y" pistons thereof, as well as the X–X' and Y–Y' axes, are horizontally disposed rather than vertically oriented as in FIGURE 1. To facilitate the correspondence of these structures, the X–X' and Y–Y' axes have been shifted by 90° in a counterclockwise direction as between FIGURES 1 and 2, so that the X and X' casing caps or cylinder end closures are rigidly secured to the frame or plate P which is bolted or otherwise rigidly secured to the floor. In view of such correspondence of structure, no further description of the various X and Y components will be set forth, and it may simply be stated that the same numerals are used to identify the respectively corresponding components except that the order of such numerals has been raised to the six hundred series.

However, with respect to the vertically-oriented vibratory components, the structure disposed along the Z–Z' axis will be considered in detail; and it will be evident that the X, Y and Z axes correspond to the usual coordinate system of solid analytic geometry and, therefore, intersect at an origin and at right angles to each other.

The pistons 652$^y$ and 652$^{y'}$ are provided centrally with a relatively large opening therethrough in which is rigidly mounted a casing 656$^{z'}$ defining a cylinder 674$^{z'}$ therein, the longitudinal axis of which is substantially coincident with the Z–Z' axis. Reciprocable within the cylinder is a piston 652$^{z'}$ having at its upper end a hemispherical socket that receives a ball 653 therein; and the ball 653 is retained within the socket by the usual retainer plate which is bolted to the piston 652$^{z'}$. Thus, a typical ball and socket joint is provided which affords substantially universal pivotal movement for the ball 653 relative to the piston 652$^{z'}$. Integral with the ball 653, or otherwise rigidly secured thereto, is an upwardly extending leg 620 which defines one of the supports for the factory machine (not shown). Such factory machine is the body in which the occurrence of vibration is necessary or unavoidable, and it is the center of gravity thereof that experiences vibratory displacements of a 3-dimensional or solid character. Such vibratory displacements, however, are imposed on the leg 620 and on the ball 653, and, consequently, the leg 620 may be taken to be indicative of the vibrating body.

The casing 656$^{z'}$ has a casing cap or cylinder end closure 634$^{z'}$ bolted or otherwise sealingly secured thereto, and such end closure defines a relatively large chamber 668$^{z'}$ therewithin. This chamber is in open communication with the cylinder 674$^{z'}$, and together, the chamber and that portion of the cylinder in communication therewith define a constant pressure space. Fluid is continuously supplied to the constant pressure space through a restricted infeed orifice 634$^{z'}$ and may escape from such constant pressure space through exhaust outlets 634$^{bz'}$.

Quite evidently, the piston 652$^{z'}$ and end closure 634$^{z'}$ provide relatively reciprocable opposed surfaces between which is operative a fluid column defined within the constant pressure space. The value of the pressure force acting upwardly against the piston 652$^{z'}$ must be sufficiently great to support the downwardly directed load or force component appearing at the leg 620, since such pressure force is the only force opposing the load. If the magnitude of such load changes, the force-transmitting linkage composition comprised by the constant pressure space, inlet orifice, exhaust outlet and piston automatically adjusts to compensate therefor.

For example, if the magnitude of the load is increased, the piston 652$^{z'}$ is displaced downwardly within the cylinder 674$^{z'}$, whereupon the effective escape area of the exhaust outlet 634$^{bz'}$ is reduced, the pressure within the constant pressure space builds up and continues to rise until the value of the pressure force acting upwardly against the piston is sufficient to return the same upwardly to its prior stable position, which is shown in FIGURE 2. If, on the other hand, the load is decreased, the piston is displaced upwardly because of the superior value of the pressure force, the effective escape area of the exhaust outlet is increased, and the pressure within the constant pressure space decreases and continues to decrease until the value of the pressure force acting upwardly against the piston has been diminished in value to the extent necessary to permit the piston to return to its prior stable position.

Summarizing, then, the linkage system or composition in its entirety functions to transmit force between a necessarily or unavoidably vibrating body (represented by the leg 620) and a body in which the occurrence of vibration is undesirable (the plate P and floor to which it is attached) without transmitting 3-dimensional or solid vibration therebetween; and in so doing, the five individual force-transmitting linkage structures function in unison, but their individual actions are separately analyzable in precisely the same manner as the four individual linkage structures shown in FIGURE 1 and described in detail in connection therewith. Additionally, the linkage system or composition in its entirety is operative to automatically compensate for changes in both the value and direction of any loading force, sidewise or vertical, imposed on the necessarily vibrating body irrespective of whether such loading is oriented along the X, Y or Z axis (any loading force along the Z axis being considered, in the structure of FIGURES 2 and 3, to always be downwardly directed), and irrespective of whether such loading force has any other orientation (with the exception noted) relative to the X, Y and Z coordinates.

Any factory machine will have all of its supports, usually four, respectively connected to the floor or other supporting member through individual linkage compositions, and the various universal joints, which are defined in part by each ball 653, enable the various linkage compositions to accommodate vibratory displacements of the respectively associated support legs and perform their corrective actions somewhat independently of each other, which is desirable in that it is infrequent that the vibratory displacements of such machine are of a character that permit the corrective actions of the individual linkage compositions to be in precise similitude.

Figure 4:
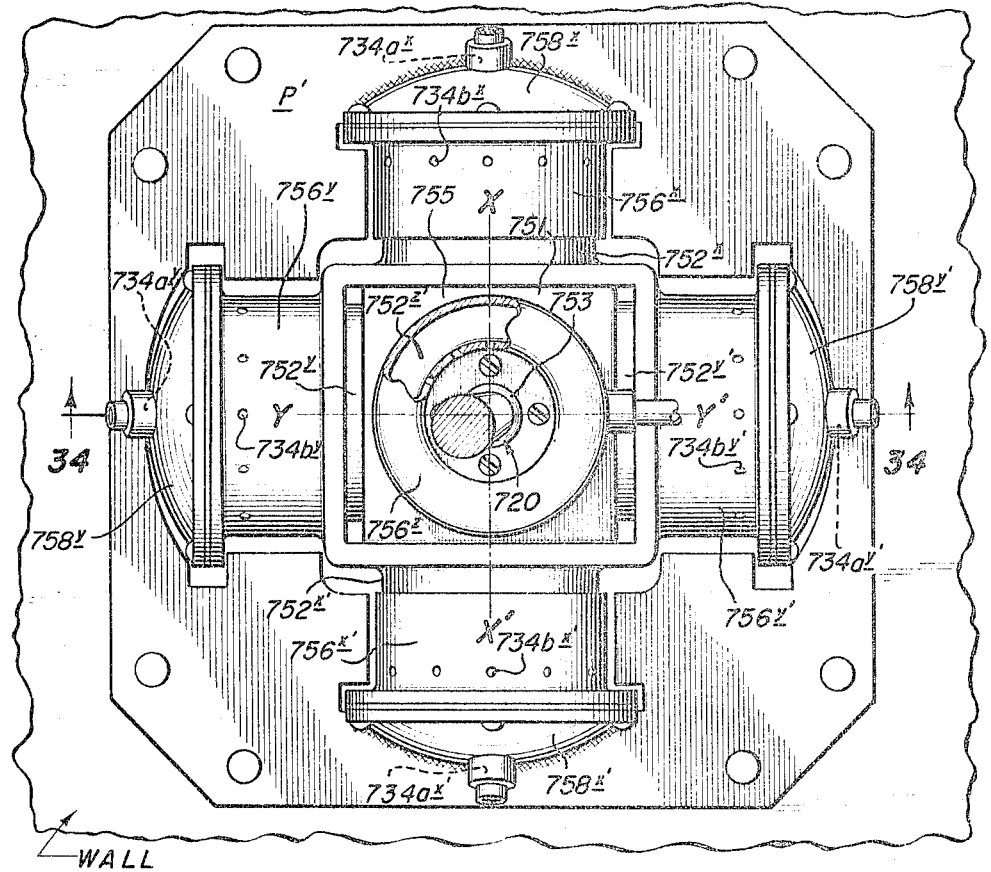
FIGURE 4 is a top plan view of a modified machine support for eliminating 3-dimensional or solid vibration.
Figure 5:
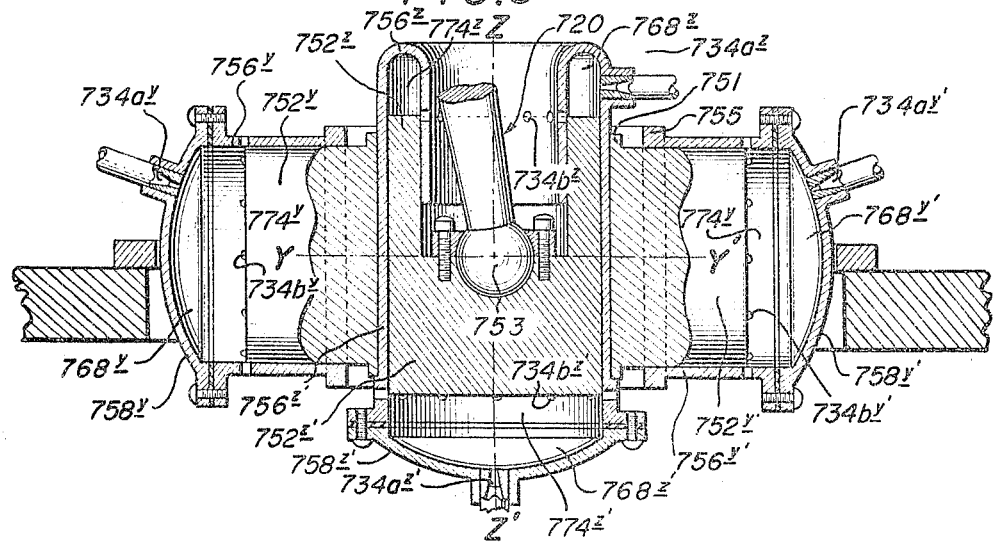
FIGURE 5 is a transverse sectional view taken along the plane 5-5 of FIGURE 4.

The embodiment of the invention illustrated in FIGURES 4 and 5 also has for its purpose the elimination of 3-dimensional or solid vibration, and differs from the structural composition shown in FIGURES 2 and 3 in that it obviates the limitation noted with respect to such prior embodiment, namely, that the force operative generally along the Z–Z' axis is required to have a downward direction, that is, in the Z' direction. Therefore, the only significant difference in the two embodiments appears in the structure along the Z axis and at a location above the intersection of the Z axis with the Y–Y' axis.

Accordingly, the respectively corresponding components of the structure shown in FIGURES 4 and 5 are designated with the same numerals used in FIGURES 2 and 3 except that the order of such numerals has been elevated to the seven hundred series. With respect to the additional components that permit a force acting along the Z axis to have an upward direction, the casing $756^{z'}$ is turned inwardly at its upper end and extends downwardly and toward the Y–Y' axis. Thus, the casing $756^{z'}$ at its upper end defines between the substantially parallel inner and outer walls thereof an annular cylinder $774^z$, and reciprocable within such cylinder is an annular piston $752^z$. The piston $752^z$ is formed integrally with the piston $752^{z'}$ and reciprocates simultaneously therewith in mechanically-enforced synchronism. The cylinder $774^z$ is in open communication with a chamber $768^z$ defined within the inwardly turned end portion or end closure $756^z$ of the cylinder casing.

The cylinder $774^z$ and chamber $768^z$ provide a constant pressure space to which fluid is continuously supplied through a restricted inlet orifice $734^z$. Fluid is permitted to escape from such constant pressure space through an exhaust outlet $734^{bz}$ which is adapted to be traversed by the piston $752^z$ that regulatively controls the flow of fluid through the outlet. The exhaust outlet communicates with the interior of a large opening formed within the inner wall of the casing. The support leg 720 of the factory machine (not shown) extends upwardly through such opening, which is at atmospheric pressure, and at its lower end the support leg is equipped with a ball 753 that seats within a semi-hemispherical socket provided by the piston $752^{z'}$.

The vibration-isolating function of the linkage composition is performed in exactly the same manner as heretofore described with particular reference to the embodiment illustrated in FIGURES 2 and 3, and has the added advantage of being able to accommodate a force that acts upwardly as well as downwardly along the Z axis. Therefore, the linkage system or composition in its entirety comprises six individual force-transmitting linkage structures, and is wholly symmetrical about the origin of the X, Y, and Z axes.

Inspection of the various drawings makes it evident that each of the embodiments affords sufficient structural clearance to accommodate necessary motions between the various relatively reciprocable components thereof. For example, in FIGURE 1, the casing elements $556^x$ and $556^{x'}$ are spaced a sufficient distance from the composite casing $556^y$–$556^{y'}$ to permit the latter to reciprocate freely along the X–X' axis through a range of movement, and the points of possible abutment of the composite cylinder casing with the respective casing elements $556^x$ and $556^{x'}$ define the extreme limits of the range of such reciprocatory movement of the pistons $552^x$ and $552^{x'}$. Similarly, abutment of the shaft 553 with the perimetric edges of the elongated openings in the composite casing $556^y$ and $556^{y'}$ defines the extreme limits of the range of reciprocatory movement afforded for the pistons $552^y$ and $552^{y'}$. Abutments between the relatively reciprocable components are substantially avoided by proper action of the linkage structures; and, therefore, the force-transmitting linkage structures are effective to enforce a positional stability onto such relatively reciprocable components, and such positional stability is that in which the relatively reciprocable components including the elements attached thereto or carried thereby are maintained in a substantially continuous condition of impact-preventing separation therebetween. This same condition exists as to the structural compositions shown in FIGURES 2 and 3 and FIGURES 4 and 5.

As stated hereinbefore, there are many important instances in which 2-dimensional or planar, and 3-dimensional or solid vibrations are transmitted from a necessarily or unavoidably vibrating body to a body in which the occurrence of vibration is undesirable, and the illustrative environments shown in the drawings and described in detail herein are intended to exemplify a wide variety of such instances. An example of another instance is a railway car, and the passenger- or load-carrying compartment thereof is a body in which the occurrence of vibration is undesirable and it is force-connected to and is supported by a wheel-equipped frame structure which is a body in which the occurrence of vibration is necessary or unavoidable. Such force-connection of the two bodies is through a force-transmitting linkage in the form of a spring system that, unfortunately, transmits vibration from the wheel and frame structure to the car body.

The character of the vibration so transmitted to the car body is essentially 2-dimensional or planar in that the primary vibratory disturbances in a railway car occur along the transverse and longitudinal axes thereof. Although some vertical vibratory displacements are transmitted to the car body, they are, for the most part, negligible and may be disregarded. Thus, a railway car is an important instance of an environment in which 2-dimensional or planar vibration exists, and in which it would be advantageous to eliminate the transmission thereof from the wheel-equipped frame structure to the car body.

Road vehicles, such as the automobile, are a well known environment in which 3-dimensional or solid vibration exists. In a road vehicle, the wheel-equipped chassis thereof is continuously subjected to vibratory displacements along both the transverse and longitudinal axes thereof, as well as being subject to vertical displacements. Unfortunately, all such vibratory displacements of the wheel-equipped chassis are transmitted to the body or passenger compartment of the vehicle, although in attenuated form, by the spring and shock absorber suspension systems which are force-transmitting linkages that support the vehicle body upon the wheel-equipped chassis. Thus, the passenger- or load-carrying compartment of the road vehicle is a body in which the occurrence of vibration is objectionable, the wheel-equipped chassis defines a body in which the occurrence of vibration is necessary or unavoidable, and the suspension system is a force-transmitting linkage that transmits a necessary supporting force therebetween.

The invention illustrated in the drawings and described in the environments of flywheels and factory machines may be employed with equal effect and results in other environments, including the railway car and road vehicle, to eliminate 2- and 3-dimensional vibration.

While in the foregoing specification embodiments of the invention have been set forth in considerable detail for purposes of making an adequate disclosure thereof, it will be apparent to those skilled in the art that numerous changes may be made in such details without departing from the spirit and principles of the invention.

I claim:

1. In combination, a vibratory element subject to 3-dimensional vibratory displacements, an element in which the occurrence of vibration is undesirable, and connecting linkage for effectuating a necessary transmission of force between said elements in the planes of such 3-dimensional vibratory displacements including means for automatically adjusting the value of such transmitted force to maintain a predetermined relation between the vibratory and second mentioned elements, means for maintaining any such adjusted value relatively constant throughout any cycle of the vibratory motion of said vibratory element, said linkage being automatically operative to determine the direction of such transmitted force along such planes in its application to said elements.

2. The combination of claim 1 in which said connecting linkage comprises three pairs of linkages oriented at substantially right angles with respect to each other.

3. The combination of claim 1 in which each of said linkages includes two linkage components respectively operative to transmit a component of such force.

References Cited by the Examiner

UNITED STATES PATENTS

| | | | |
|---|---|---|---|
| 1,973,510 | 9/1934 | Schieferstein | 74—574 |
| 2,138,531 | 11/1938 | Wise et al. | 74—574 X |
| 2,277,185 | 3/1942 | Thege | 74—574 X |
| 2,312,718 | 3/1943 | Kouyoumjian | 248—358 |

MILTON KAUFMAN, *Primary Examiner.*

B. G. DURHAM, *Examiner.*

T. W. SHEAR, *Assistant Examiner.*